US006360162B1

(12) United States Patent

Meis et al.

(10) Patent No.: US 6,360,162 B1

(45) Date of Patent: Mar. 19, 2002

(54) PROCESS FOR INFORMING AN INFORMATION CENTER ABOUT THE PATH COVERED BY A VEHICLE IN A ROAD NETWORK, TERMINAL, INFORMATION CENTER

(75) Inventors: Josef Meis, Münster; Jens Oppler; Oliver Michael, both of Düsseldorf, all of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/331,090

(22) PCT Filed: Nov. 26, 1997

(86) PCT No.: PCT/DE97/02817

§ 371 Date: Jul. 12, 1999

§ 102(e) Date: Jul. 12, 1999

(87) PCT Pub. No.: WO98/27524

PCT Pub. Date: Jun. 25, 1998

(30) Foreign Application Priority Data

Dec. 16, 1996 (DE) ........................................ 196 53 686
Nov. 5, 1997 (DE) ........................................ 197 49 978

(51) Int. Cl.[7] ............................................ G06F 165/00

(52) U.S. Cl. ....................... 701/117; 701/200; 340/990; 340/995; 342/454; 73/178 R

(58) Field of Search ................................ 701/117, 200, 701/201, 207, 210, 213, 220; 340/990, 995; 342/454; 73/178 R

(56) References Cited

U.S. PATENT DOCUMENTS 5,911,773 A * 6/1999 Mutsuga et al. ............ 701/200

* cited by examiner

*Primary Examiner*—William A. Cuchlinski, Jr.
*Assistant Examiner*—Arthur D. Donnelly
(74) *Attorney, Agent, or Firm*—Cohen, Pontani, Lieberman & Pavane

(57) ABSTRACT

The invention describes an efficient transmission of data for making possible an accurate reconstruction of a path driven by a vehicle in a traffic network, a terminal unit, a central bureau and a process for informing (13) a central bureau (107) about a path, in particular for informing a central traffic bureau about a path traveled by a vehicle (101) with a terminal unit in a traffic network, wherein location data representing the respective location of the terminal unit (102) is repeatedly detected by a terminal unit (102) with a location detection device (20), wherein reference points (108 to 112) are defined at a plurality of locations by the terminal unit on the traveled path based on criteria present in the terminal unit, wherein reference point information relating to these reference points (108 to 112) is transmitted (13) from the terminal unit (102) to the central bureau (107).

21 Claims, 9 Drawing Sheets

| No | EVENT | ACTIONS |
|---|---|---|
| 1 | BEAD PLACEMENT WAS CAUSED. | – |
| 2 | THE DRIVING STATE WAS DETECTED AS STABLE. | 1. IF AN LSP EXISTS, IT IS CANCELED.<br>2. IF THERE ARE NOT YET BEADS IN THE CIRCULAR STORAGE, A BEAD IS PLACED (FOR PURPOSES OF INITIALIZATION) |
| 3 | THE DRIVING STATE WAS DETECTED AS STABLE. | 3. IF A LAST STABLE POINT (LSP) EXISTS, A BEAD IS PLACED AT THIS POINT.<br>4. A BEAD IS PLACED AT THE CURRENT POSITION. |
| 4 | THE DRIVING STATE IN THE UNSTABLE STATE HAS EXCEEDED *DIST-MAX-WAIT.* | 1. IF AN LSP EXISTS, A BEAD IS PLACED AT THIS POINT.<br>2. A BEAD IS PLACED AT THE CURRENT POSITION. |
| 5 | BEAD PLACEMENT WAS CAUSED. | A BEAD IS PLACED AT THE CURRENT POSITION. |
| 6 | THE DRIVING STATE WAS DETECTED AS UNSTABLE. | IF THE DRIVEN DISTANCE EXCEEDS *DIST-MIN-STABIL,* AN LSP IS GENERATED. |
| 7 | THE DRIVING STATE WAS DETECTED AS UNSTABLE AND BEAD PLACEMENT WAS CAUSED. | IF THE DRIVEN DISTANCE EXCEEDS *DIST-MIN-STABIL,* AN LSP IS GENERATED. |
| 8 | THE CANCEL BUTTON WAS ACTIVATED. | 1. IF A LAST STABLE POINT (LSP) EXISTS, A BEAD IS PLACED AT THIS POINT.<br>2. A BEAD IS PLACED AT THE CURRENT POSITION. |
| 9 | THE CANCEL BUTTON WAS ACTIVATED. | 1. IF A LAST STABLE POINT (LSP) EXISTS, A BEAD IS PLACED AT THIS POINT.<br>2. A BEAD IS PLACED AT THE CURRENT POSITION. |
| 10 | THE CANCEL BUTTON WAS ACTIVATED. | A BEAD IS PLACED AT THE CURRENT POSITION. |

FIG.4

| | PARAMETERS | DEFAULT VALUE | BRIEF DESCRIPTION |
|---|---|---|---|
| 1 | DIST-MAX | 1000 m | BEAD PLACEMENT IS CAUSED AFTER THIS ROUTE DISTANCE IS EXCEEDED. |
| 2 | ANGLE-DEVIATION | 45° | IF THE DIFFERENCE BETWEEN THE CURRENT DRIVING ANGLE AND THE ANGLE OF THE LAST BEAD EXCEEDS THIS VALUE, BEAD PLACEMENT IS CAUSED AS SOON AS THE ROUTE DISTANCE WITH RESPECT TO THE LAST BEAD EXCEEDS *DIST-MIN.* |
| 3 | DIST-MIN | 100 m | MINIMUM ROUTE DISTANCE BETWEEN TWO BEADS |
| 4 | STABIL-ANGLE | 10° | STABIL-ANGLE DETERMINES, ALONG WITH STABIL-PATH, WHETHER OR NOT A VEHICLE IS IN AN "UNSTABLE" STATE, I.E., WHETHER OR NOT A SHARP CHANGE IN ANGLE (e.g., AS A RESULT OF A TURN) OCCURS AT THAT TIME. (SEE ALSO DEFINITION IN 5.3). |
| 5 | STABIL-PATH | 30 m | STABIL-ANGLE DETERMINES, ALONG WITH STABIL-ANGLE, WHETHER OR NOT A VEHICLE IS IN AN "UNSTABLE" STATE, I.E., WHETHER OR NOT A SHARP CHANGE IN ANGLE (e.g., AS A RESULT OF A TURN) OCCURS AT THAT TIME. (SEE ALSO DEFINITION IN 5.3). |
| 6 | STABIL-MAX-WAIT | 150 m | THE PATH AFTER WHICH A BEAD IS ALSO PLACED DURING AN UNSTABLE STATE |
| 7 | DIST-MIN-STABIL | 300 m | WHEN THIS PATH LENGTH IS EXCEEDED, ALL DATA FOR GENERATION OF A BEAD IS HELD UP WHEN ENTERING AN UNSTABLE STATE (SEE ALSO 5.3) |

FIG.5

EXAMPLE 3: AN LSP WAS SET, BUT NO BEAD WAS GENERATED BECAUSE THERE WAS NO CAUSE FOR SETTING A BEAD (NEITHER THE ANGLE CRITERION NOR THE DISTANCE CRITERION WAS MET).

PROCESS FOR INFORMING AN INFORMATION CENTER ABOUT THE PATH COVERED BY A VEHICLE IN A ROAD NETWORK, TERMINAL, INFORMATION CENTER

BACKGROUND OF THE INVENTION

1. Field of the Invention

The invention is directed to a process for informing a central bureau about the path traveled by a vehicle in a traffic network, to a terminal unit and to a central bureau.

2. Description of the Related Art

The detection of the path of a vehicle is suitable for detecting erroneous routes in interactive navigation and for obtaining geographic traffic information that can be referenced; This traffic information can be used by a central bureau for correlating traffic data such as vehicle speeds, travel times, etc. with locations on the path of the vehicle, namely with locations in a digital map of the traffic network in the central bureau, wherein traffic status reports, traffic forecasts and optimum navigation assistance can be generated in the central bureau based on traffic data from a plurality of vehicles for transmission to a vehicle. Location data relating to the path of the vehicle through a traffic network can be transmitted, especially via mobile radio, from the terminal unit in the vehicle to a central bureau. The available transmission capacity of the communications channel is limited; in particular, telecommunications costs are increased by the transmitted quantity of information.

EP-A-0 731 400 discloses a process for informing a central bureau about a path traveled by a vehicle in a traffic network, wherein the vehicle location is repeatedly detected by the vehicle with a GPS system and reference points to be transmitted to a central bureau are defined when existing criteria relating to the maximum vertical distance of a detected position to a vector line are met. In this case, reference points are set more frequently when driving along curves than during straight driving due to the fact that a predeterminable maximum vertical distance from a vector line is exceeded more frequently in the first instance.

SUMMARY OF THE INVENTION

It is the object of the invention to inform a central bureau about the path traveled by a vehicle in a traffic network with the smallest possible amount of transmitted information which represents the path of the vehicle in the traffic network in the most efficient manner and with the most accurate reconstruction possible.

The invention optimizes the transmitted amount of information about the path of the vehicle. Nevertheless, the path can be reconstructed in a favorable manner because reference points at which information is transmitted are defined at relevant locations along the path of the vehicle. The criteria by which it is determined where reference points are defined at locations along the path of the vehicle through a traffic network are, or can be, predetermined in the terminal unit. These criteria can be modified via radio, especially mobile radio, by a central bureau for a terminal unit. Reference point information concerning the defined reference points is transmitted. This information can contain the last detected location of the terminal unit in particular. Further, it can contain the current driving direction of the terminal unit.

For this purpose, the location can be detected by the terminal unit with a position detection device, particularly with GPS. The location detection of the terminal unit depends on a digital map, etc.

It can be determined from location data detected from at least two locations along the path which are driven through successively which direction the vehicle is driving in between these direction data representing at least two locations. Alternatively or in addition, it is possible to determine the direction of the vehicle with a direction detection device, especially a compass or a digital map in conjunction with means for determining the mileage and/or means for determining the steering wheel angle, etc. Driving data representing the driving direction of the terminal unit at one location or between at least two locations can be transmitted from the terminal unit to the central bureau. In particular, direction data can also be determined as angles relative to the given direction, for example, relative to a cardinal direction, wherein it is useful to determine the cardinal directions in the terminal unit, e.g., by means of a compass and/or position tracking with a digital map. Angular changes within a given unit of time can be detected from the direction data or from angle data representing an angle at least at two locations. Accordingly, a change in direction of the vehicle can be determined. With a suitable selection of the time unit, brief changes in direction, e.g., when passing another vehicle, etc., can be filtered out and only relevant changes in direction, for example, turning onto a road, driving along sharp curves in a road, etc. which are significant for a central bureau are detected and can be used in the terminal unit for defining a reference point.

A storage device (memory) is provided for storing data in the terminal unit wherein a circular storage device is used, it is possible to store the most recent, and therefore particularly relevant, data with small storage capacity.

Further, speed data representing the speed of the vehicle is preferably detected by the terminal unit; when this data is sent to the central bureau, it can be used for preparing traffic status descriptions and accordingly for traffic reports and traffic forecasts in the central bureau.

The reference points can be defined in the terminal unit in different ways. In particular, a reference point can be defined when the vehicle has traveled more than a predetermined or predeterminable minimum distance limit since the last reference point, and when the vehicle angle within a predetermined or predeterminable time unit (which can be set by a central bureau to a terminal unit via mobile radio in particular) changes by more than an angle limit value which is predetermined or can be predetermined (by a central bureau). For this purpose, at least two angles (or directions) of the vehicle at least at two locations are compared in the terminal unit and the resulting difference is compared with an angle limit. When the angle exceeds the angle limit, a reference point can be defined. Accordingly, it is possible in particular to detect relatively sharp curves in a road along a path traveled by a vehicle and changes in direction of a vehicle resulting when turning off of a road which are significant for reconstruction of the path of the vehicle in a central bureau and for correlating the vehicle path with a digital map in a central bureau.

Beyond this or instead of this, a reference point can also be defined when the vehicle advances by more than a predetermined or predeterminable maximum distance limit. For this purpose, the terminal unit preferably detects the advance of the vehicle based on a vehicle distance gauge (mileage counter) and/or location determination at at least two locations and by calculating the difference between these two locations. Therefore, a reference point is defined at least in given limiting intervals along the path. Accordingly, even when the driving direction of the vehicle does not change, reference point information is transmitted from the terminal unit to the central bureau at least in these intervals. Advisable values for the angle limit and for the distance limit are 45° and 1000 m, respectively.

Further, the defining of reference points can depend on a stability state that is defined by the extent of current angular changes. For this purpose, the stability of the vehicle can be defined such that the state is unstable when angle changes of the vehicle exceed an angle stability limit (e.g., 10°) which is advisably less than the angle limit (45°) and the state is stable below the angle stability limit. The definite of a reference point can be omitted as long as an unstable state exists. However, a reference point can be defined when the unstable state exists along a distance stability limit (e.g., 150 m) which is advisably less than the maximum distance limit. During an unstable state according to a distance stability limit (e.g., 150 m), a reference point is defined in spite of persisting instability (that is, angle changes above the angle stability limit). Accordingly, when a vehicle undergoes changes in angle within a distance exceeding the angle stability limit but below the angle limit, the definition of a reference point is delayed until the distance stability limit is reached. Accordingly, short-term angle changes such as occur when changing lanes, hunting for a parking space, etc. are filtered out and/or definition of a reference point within a curve is prevented.

The criteria for defining a reference point in the terminal unit are preferably variable and can be modified by a central bureau, especially via mobile radio. In this respect, the angle limit, the maximum distance limit, the minimum distance limit and/or the angle stability value, the distance stability limit can be changed in particular. Further, the data to be sent from a terminal unit to the central bureau at a reference point or concerning a reference point can also be changed.

The transmission of data from a terminal unit to a central bureau preferably comprises a transmitted data record containing data concerning a plurality of reference points, especially concerning the most recent reference points that the terminal unit in the vehicle has passed through.

Additional data such as vehicle speed, vehicle speed variants, etc. can also be transmitted at reference points from the terminal unit to the central bureau in addition to location data, particularly at reference points.

The process according to the invention can be realized in a software program in a terminal unit or in a central bureau.

BRIEF DESCRIPTION OF THE DRAWINGS

Further features and advantages of the invention are indicated in the further claims and in the following description of an embodiment example with reference to the drawings.

FIG. 4 is an event definition and action definition table for the transition diagram in FIG. 3;

FIG. 5 is a list of parameters for an example of realization as a program;

DETAILED DESCRIPTION OF PREFERRED EMBODIMENTS

Figure 1:
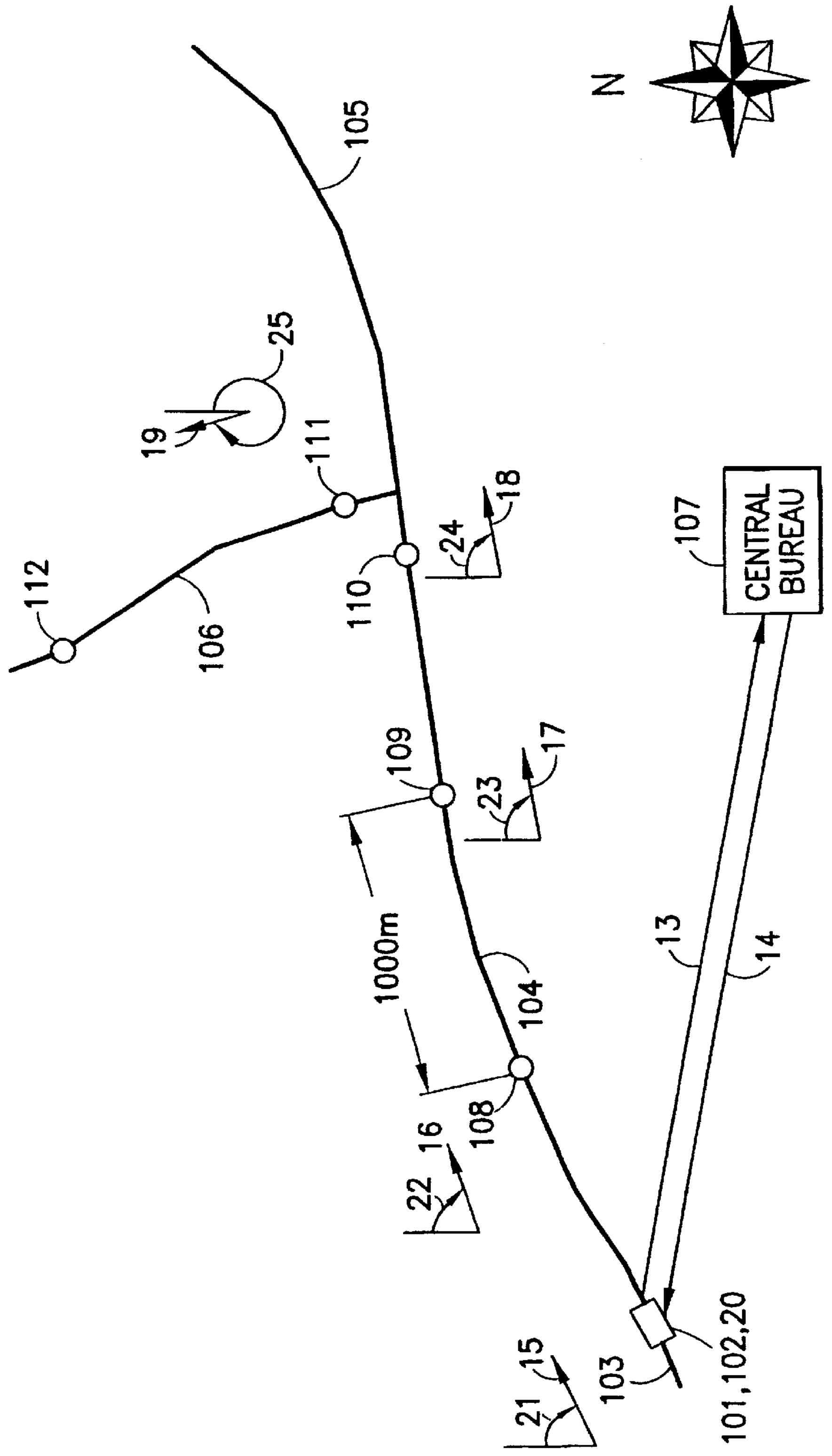
FIG. 1 is a diagrammatic reproduction of a path of a vehicle through a section of a traffic network.

FIG. 1 shows a vehicle 101 with a terminal unit 102 which moves from a starting position 103 to its current position through a traffic network 104, 105, 106 (excerpted in the Figure). The terminal unit 102 of vehicle located at its then current position 112 informs the central bureau 107 about its previous path 103, with the least possible amount of transmitted data such that the path can be reconstructed as accurately as possible in the central bureau 107 and can be correlated, if necessary, in a digital map in the central bureau 107, for example.

For this purpose, location data representing the respective location of the terminal unit are repeatedly detected in the terminal unit 102 of the vehicle 101 by a location detection device. This can be carried out, for example, based on a GPS system in the terminal unit. Location data representing a detected location can comprise, for example, the geographic length and width of the location, including a predetermined rounding off in the terminal unit and central bureau. A location can be detected continuously in the seconds clock, etc., for example.

The continuous transmission of the location of the terminal unit and, if necessary, of additional data from the terminal unit to a central bureau 107 would cause excessive telecommunications costs.

For this reason, reference points 108, 109, 110, 111, and 112 which lie on the traveled path are defined in the terminal unit, wherein reference point information concerning reference points 108 to 112, especially location data representing the location of a reference point, is transmitted 13 from the terminal unit 102 to the central bureau 107 via mobile radio, etc. The criteria by which reference points are defined are established in the terminal unit and can be changed in this case by a central bureau via mobile radio, etc. 14.

The criteria can concern especially the type of driving direction changes and/or the length of the path traveled since the last reference point or since a determined state of the vehicle.

The location of the terminal unit is detected with GPS, etc. A traveled path between two locations, especially since the last reference point, can be determined in the terminal unit, e.g., by subtraction of the location coordinates.

Determination of the direction 15 to 19 in which a vehicle drives can be carried out in the terminal unit based on location data about at least two locations and/or based on a direction detection device such as a compass 20. An angle, for example, relative to a cardinal direction, e.g., north, can be determined from the driving direction of a vehicle. Directions 15 to 19, for example, have respective angles with numbers 21 to 25 in relation to north.

In order that location data of the vehicle can be detected and transmitted at least in large minimum intervals independent from the route, change in angle, etc., a maximum distance limit 26 (dist-max in FIG. 5) of 1000 m is defined in this case, after which a reference point is always defined, so that a new reference point is always defined in the terminal unit at, in this case, 1000 m from the last reference point.

Further, it is determined that when an angle limit (angle-deviation in FIG. 5) of, in this case, 45° is exceeded within a given distance or within a time unit, a reference point is defined in every case. In this way, it is possible to detect, in particular, when a vehicle makes a turn. The angle limit is the change in angle of the vehicle between the current position and any other position within a distance of definable length or within a time interval. The time interval can be, for example, the interval in which the terminal unit receives GPS data.

Further, short-term variations in the angle of the vehicle can be filtered out by defining a stability criterion or stability criteria which implies these variations. Accordingly, e.g., a vehicle driving around in search of a parking space or fluctuation in the driving direction, e.g., due to a drunk driver, can be screened out. Definition of a reference point within a curve can also be prevented. Accordingly, angle changes below the angle limit (in this case, 45°) and above an angle stability limit of, for example, 10° can be detected and, in this case, an unstable state representing a relatively rapidly fluctuating direction can be defined. During an unstable state, the definition of a reference point can be prevented in general. In particular, an unstable state of the vehicle can be defined when the difference in the driving directions of a vehicle within a distance limit (e.g., 30 m) exceeds an angle stability value (10°) at least once or, more often, a given quantity of times. In an unstable state, e.g., frequent small changes in driving direction above 10° along a stretch of road, no reference points should be defined during the unstable state (unless the distance limit or angle limit is exceeded). However, a reference point can also be defined for an unstable state of a vehicle according to a distance stability limit (stabil-max-wait in FIG. 5).

All of the values mentioned above can be fixedly determined in the terminal unit or can be changed by a central bureau for a terminal unit via mobile radio, etc.

In a transmission from the terminal unit to the central bureau, data concerning a plurality of reference points, especially a plurality of reference points preceding the current reference point, are preferably transmitted.

Figure 3:
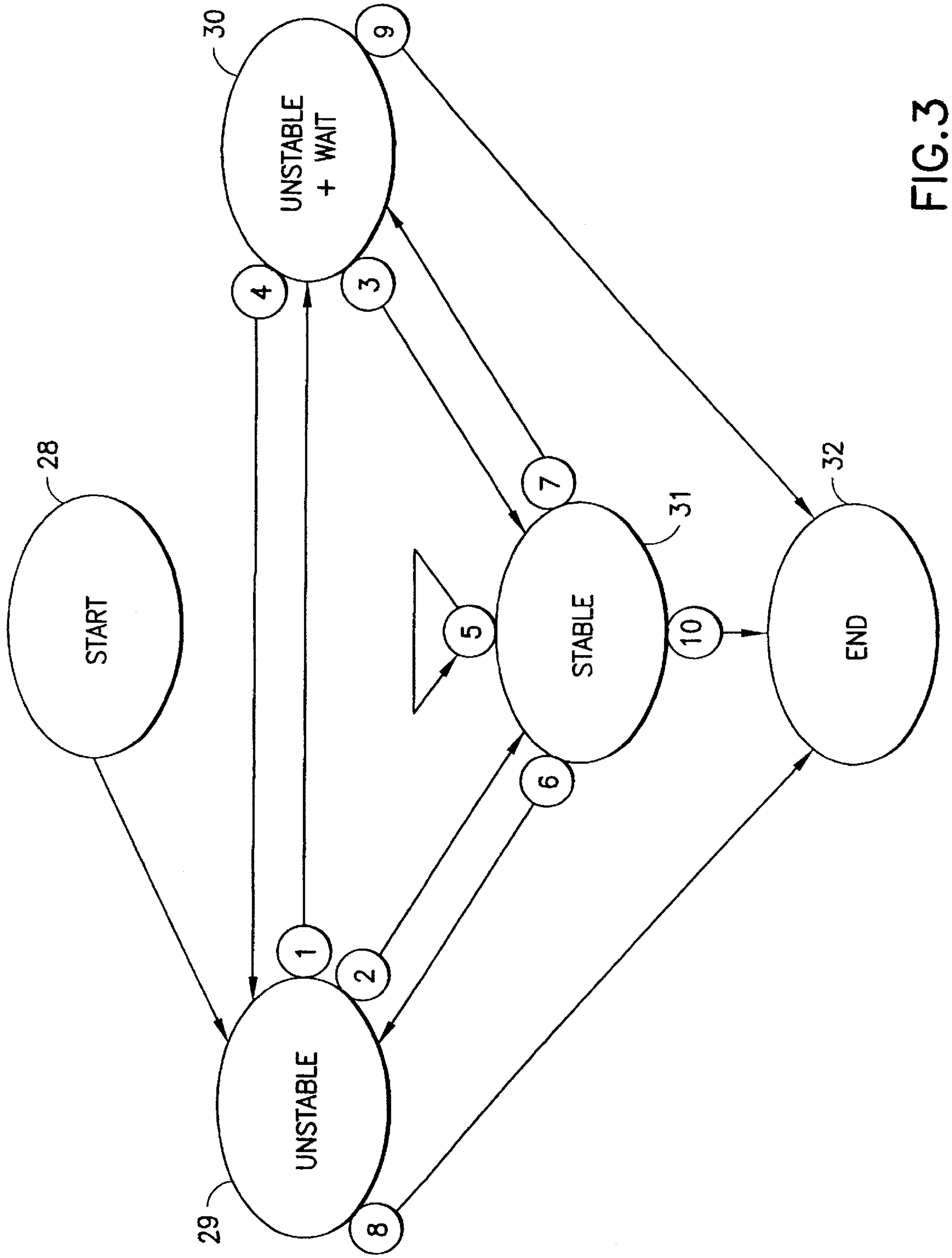
FIG. 3 is a illustrative status diagram for a computer of the terminal unit; according to an embodiment of the invention.

FIG. 3 illustrates this stability definition in the form of a state diagram and shows criteria on the basis of which reference points are defined. The vehicle initially enters the starting state 28, for example, at the start of a trip. It then automatically enters an unstable state 29. The following states are defined in addition: state 30 (unstable and waiting), state 31 (stable) and state 32 (end). State 32 (end) is triggered, for example, by pressing a cancel button in the terminal unit. This can take place, for example, at the end of a trip, and also by removing an ignition key.

After state 32, it is possible to change to states 29, 30 or 31.

The transitions of states 29 to 32 from one to the other are shown in FIG. 4 with associated actions. The defining of a reference point is referred to as placing a bead, a reference point is referred to as a bead. Where the last state at which the state of a terminal unit was stable, that is, for example, when no changes in driving direction in excess of 10° occurred, is defined as LSP.

FIG. 5 shows a table of suitable parameter definitions for realizing a program especially in accordance with the state transition in FIG. 3 and the table in FIG. 4. Based on these parameters, criteria for causing a reference point to be defined and additional conditions for defining an occurring reference point can be defined. The defining (bead placement) of a reference point (bead) is caused, according to lines 1 and 2 in FIG. 5, when the vehicle has traveled more than a maximum distance limit (dist-max) of, in this case, 1000 m since the last reference point or when the vehicle is driving at the moment in a direction at a different angle from the driving direction angle at the last defined reference point which lies above an angle limit (angle deviation) of, in this case, 45° and when, under the last condition, the distance covered since the last reference point is greater than a minimum distance limit (dist-min) of, in this case, 100 m. After definition of a reference point is caused, a reference point is defined only when a further condition is met. Such an additional condition can be, for example, the stability of driving behavior defined on the basis of angle changes which are currently in effect. In particular, the driving state of the vehicle can be defined as unstable when there occurs at that time a sharp change in angle as a result of a turn, driving along a curve, etc. exceeding an angle stability limit (stabil-angle) of, in this case, 10° relative to a previous location preceding by a determined time or by a determined path. In this way, a reference point can be prevented at the location of a brief angle change or during a change in angle. In the event of a state of the vehicle due to current exceeding of the angle limit (stable angle) of, in this case, 10°, there is also no defining of a reference point after a reference point is caused; as the case may be, instability of a vehicle may be assumed only in the presence of a further criterion. For example, instability can be assumed when an angle stability limit (stabil-angle) is exceeded only when the angle stability limit (stabil-angle) of, in this case, 30 m, is exceeded in order, (e.g., to filter out short-term angle variations when a vehicle drives around in search of a parking spot), when changing lanes or in the case of drunk driving. When the state of a vehicle is unstable because of a change in angle exceeding an angle stability limit (stabil-angle) or because of an angle currently exceeding an angle stability limit (stabil-angle) during a distance exceeding an instability distance limit, a new reference point can be currently defined in spite of the absence of stability after traveling a distance since the last reference point, which distance exceeds a distance stability limit.

FIGS. 6 to 9 illustrate examples for the conditions for causing a reference point to be defined and for additional conditions for defining a reference point. In the examples in FIGS. 6 to 9 of a location detection device (in this case, GPS), the location of the vehicle is measured at regular time intervals, wherein the location at which the terminal unit in the vehicle receives location data from the location detection device 20 in the vehicle is identified by a black dot. The route of the vehicle during a stable state is shown by a solid line, the path of the vehicle in an unstable state is shown in a lighter, dashed line. The location at which a reference point has been defined (or at which a "bead" has been placed) is shown as a circle. The reference points are referred to as beads because the path of a vehicle identified by beads resembles a string of beads.

Figure 6:
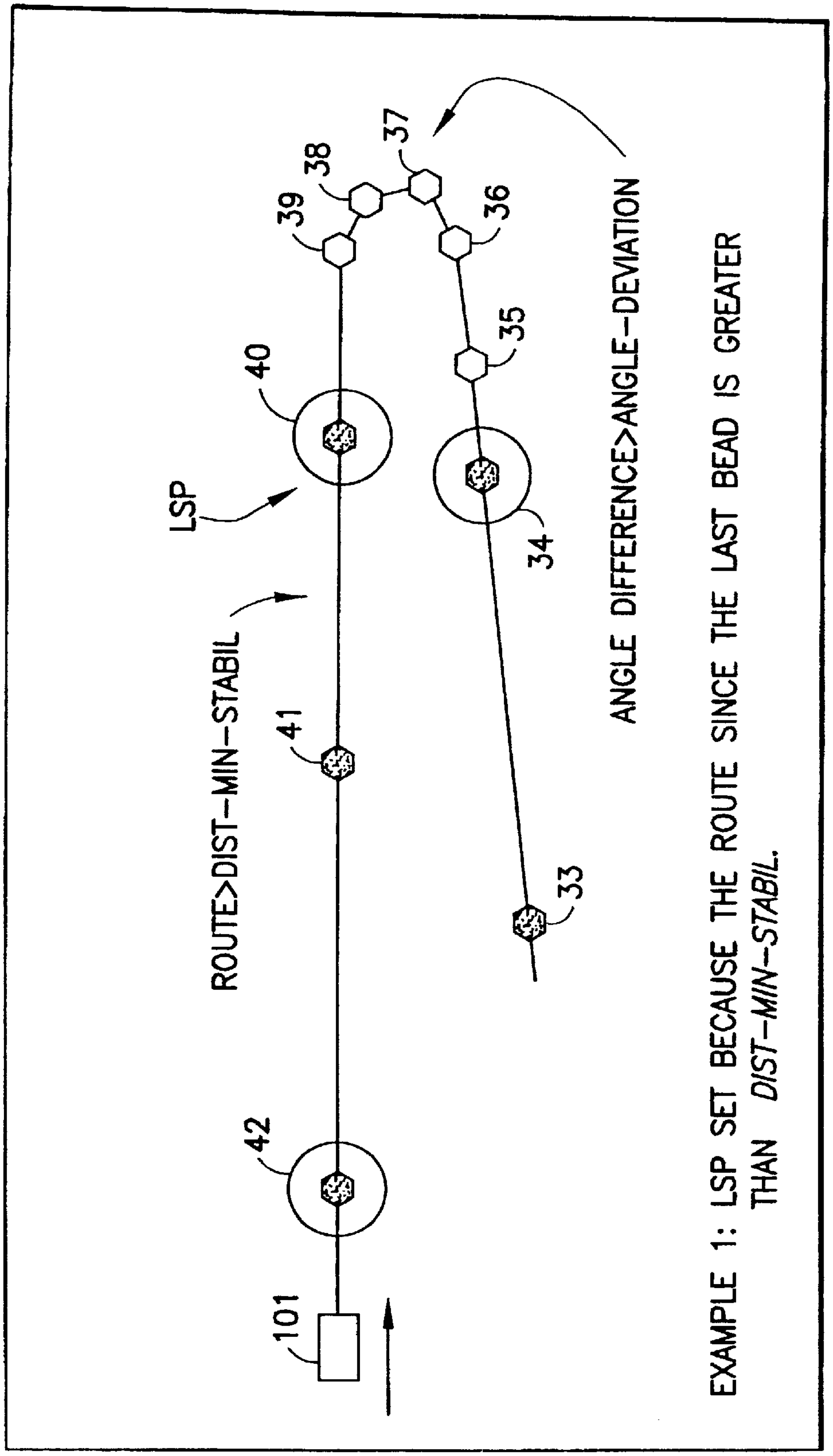
FIGS. 6 to 9 show examples of setting reference points (identified here as beads) on the path of a vehicle through a traffic network. According to the present invention.

With reference to FIG. 6, the vehicle 101 moves from the upper left toward the right, then around the curve and toward the lower left. A vehicle position was reported to a terminal unit in the vehicle at points 42 to 33 by the location detection device 20 in the vehicle. The reason why the beads lie close together in the curve area at right in FIG. 6 is that the vehicle moves slowly in this area. In order to enable the best possible reconstruction of the route in a central bureau, the reference points along the route at which location information is transmitted are determined. No location information is transmitted in the area of a curve because this information wold have too little informational content. Therefore, because of large angle changes in the area of the curve (39 to 35), the state of the vehicle is defined as unstable because of a change in direction exceeding an angle stability limit (stabil-angle) (in relation to a value at the time when the last location was detected by the location detection system). The last point at which no change in direction exceeding an angle stability limit was carried out is point 40. Therefore, point 40 is defined as the last stable point (LSP). After the curve, the first point at which the vehicle is again in a stable state is point 34 which is defined again as LSP. During the curve 39 to 35, no reference point is defined. However, a reference point is defined before (40) and after (34) a curve.

After point 34, the vehicle accelerates, so that the points at which the location detection system in the vehicle delivers data lie farther apart spatially. In this case, the route (between 34 and 33) is stable because the angle change (no angle change in this case) lies below the angle limit (angle-deviation), so that a reference point can be defined again at the next point at which location data exist after a distance exceeding a maximum distance value (dist-max) has been covered.

Figure 7:
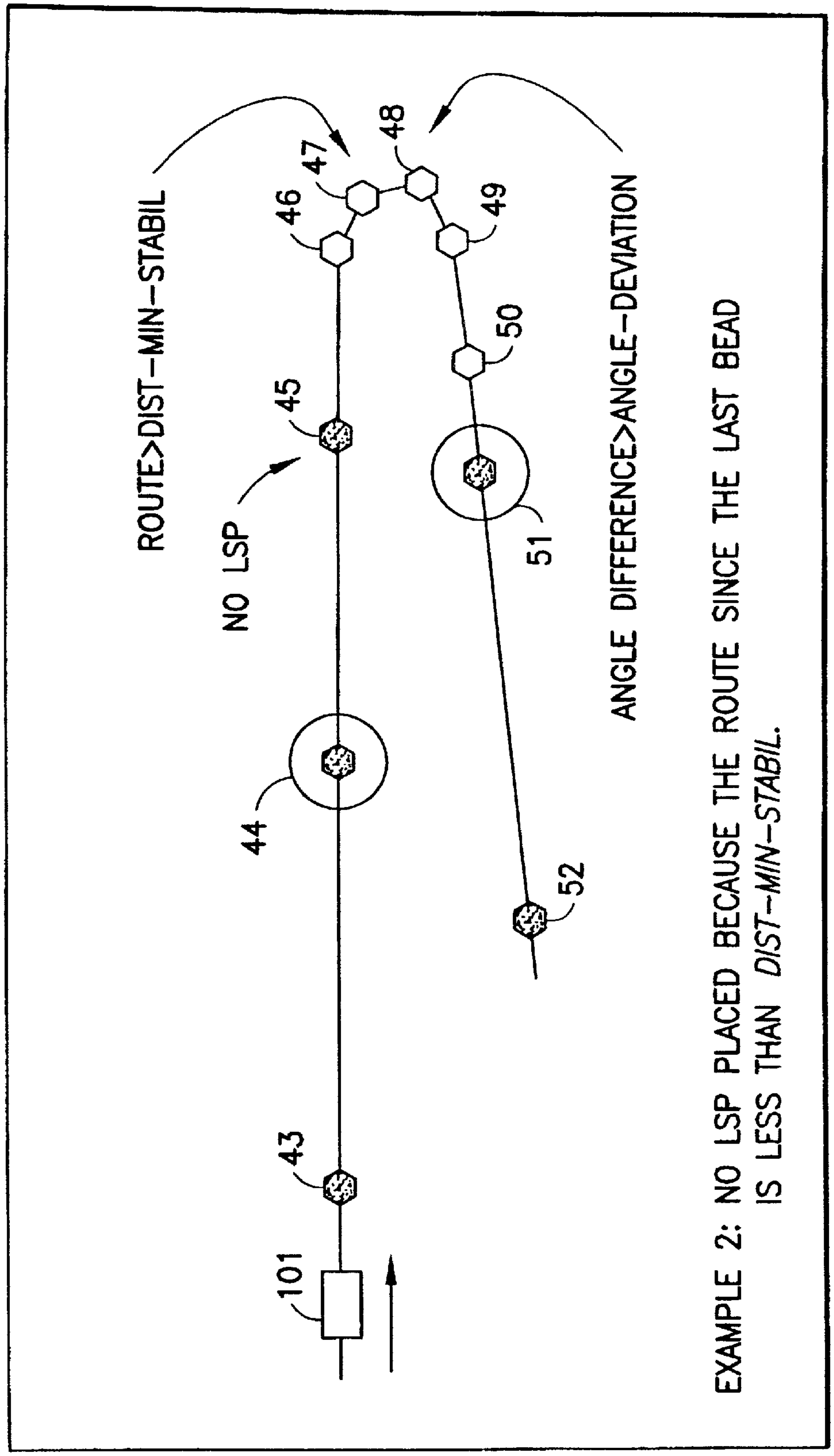

In FIG. 7, the vehicle moves from the upper left to the right, around the curve and from right to lower left over points (with existing location data from the location data detection device) 43 to 52. The maximum distance limit (dist-max) since the last defined reference point is exceeded at point 44 and the state is stable (based on an angle change (in this case no change in angle) lying below the angle stability value (stabil-angle)), so that a reference point is defined at point 44. The next time the maximum distance limit (dist-max) of the section of road is exceeded takes place in the area of the curve 46 to 50. However, a last stable point is not defined at point 45 because the distance to the last reference point 44 is less than dist-min-stabil. No reference point is defined during the curve 46 to 50 because the state of the vehicle is defined as unstable based on a change in angle exceeding the angle limit (angle-deviation). After the curve, the state is stable again at point 51 (because of driving in a straight line, i.e., based on a change in angle lying below the angle limit), so that the reference point definition that has already been caused is carried out in this case.

Figure 8:
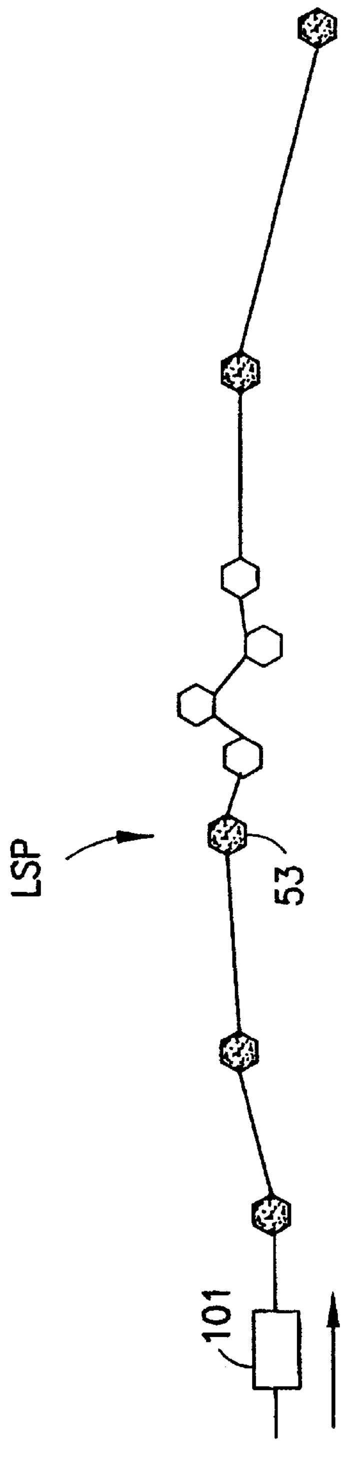

In FIG. 8, a last stable point is defined at point 53. However, no definition of a reference point is caused because there is no change in angle exceeding an angle limit (angle-deviation), nor has a distance been covered which exceeds a maximum distance limit (dist-max).

Figure 2:
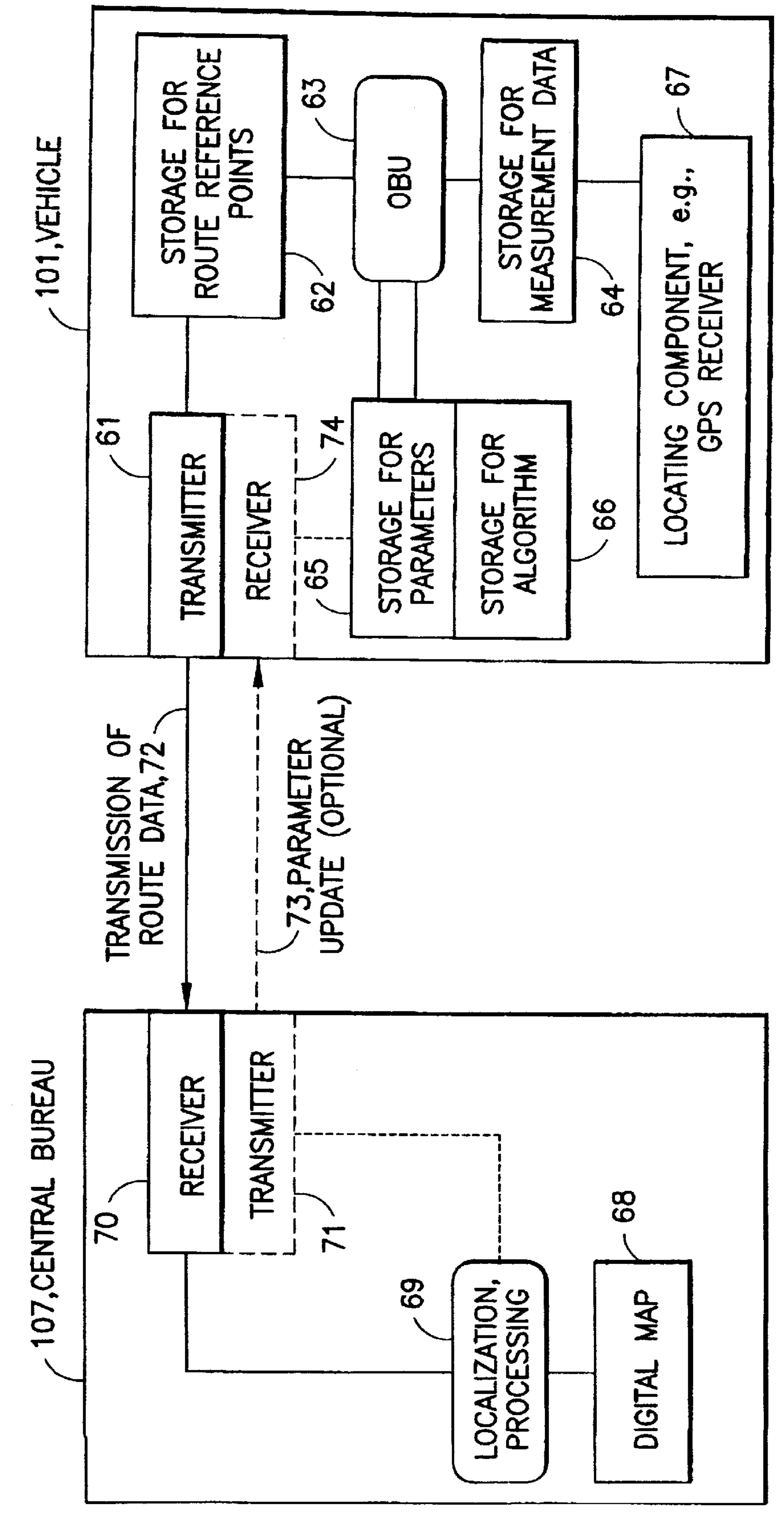
FIG. 2 is an abstract, general block diagram representing a vehicle terminal unit and a central bureau and communication therebetween; according to an embodiment of the invention.
Figure 9:
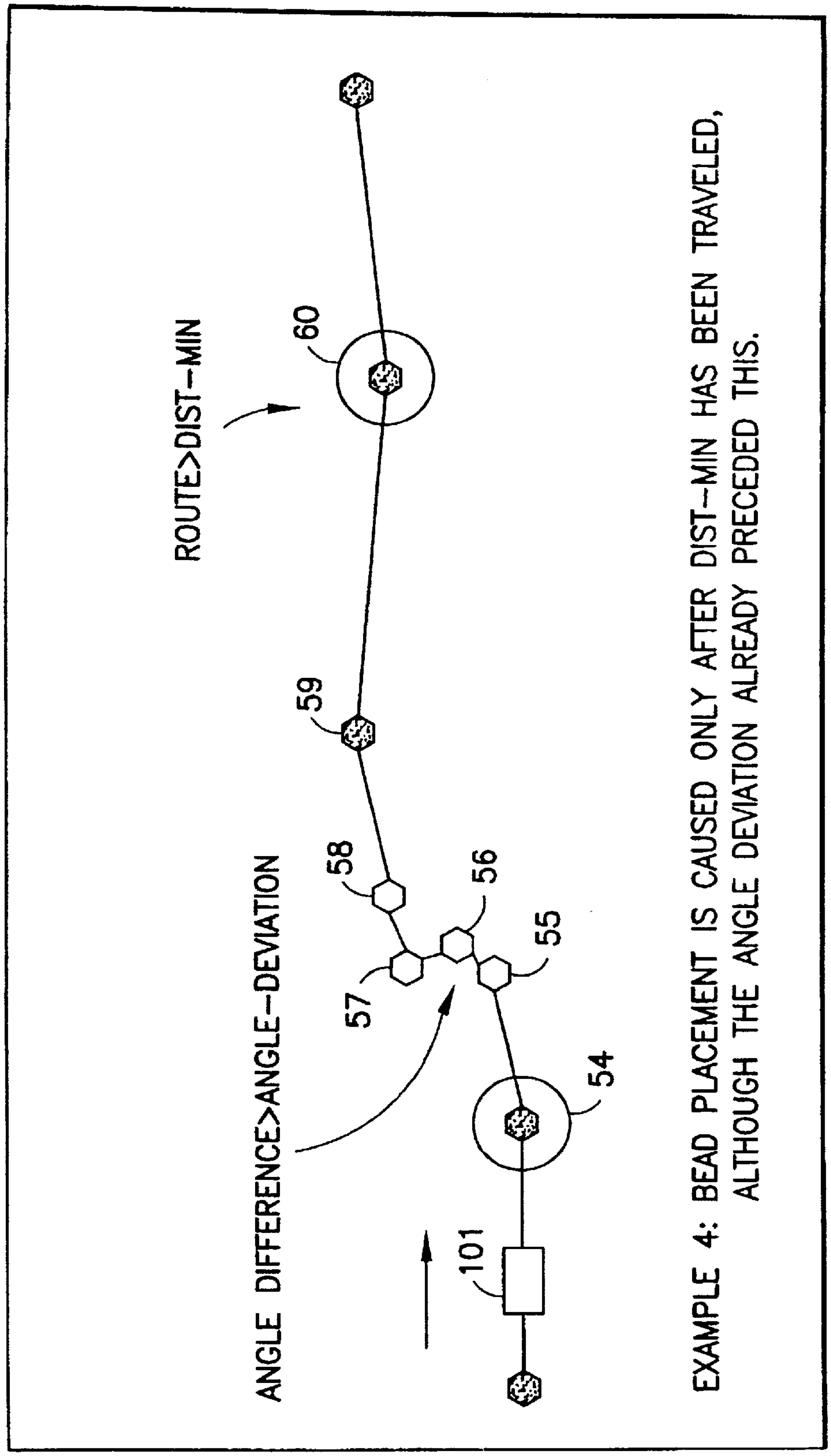

In FIG. 9, the vehicle moves from left to right. A reference point was defined at point 54. Angle changes exceeding the angle limit (angle-deviation) took place at points 55 to 58, so that the state of the vehicle was defined as unstable. However, no reference point was defined at point 59 because a distance lying below the minimum distance limit (dist-min) was covered between points 54 and 59. Proceeding from point 54, a distance exceeding the minimum distance limit (dist-min) was first covered between 59 and 60. Therefore, the defining of a reference point was first carried out at point 60 because between 55 and 59 the change in angle exceeded the angle limit. FIG. 2 shows a block diagram representing a vehicle 101 and a central bureau 107. The following are located in the vehicle 101: a communications interface 61 with a transmitter and receiver, a storage 62 unit of memory for route reference points, a central computer (e.g., a CPU) 63, a storage unit of memory for measurement data (especially vehicle speeds and other data to be transmitted to the central bureau) 64, a storage unit of memory 65 for parameters for deciding whether to define a reference point, a storage unit of memory 66 for the algorithm (namely, the program for carrying out the process), a location-finding component 67 comprising a GPS receiver (which can also, alternatively or additionally, determine location based on detected driving direction, distance and a digital map in the vehicle).

The central bureau 107 comprises a stored digital map 68 of the traffic network on which the vehicle 101 is driving, a device 69 for locating the vehicle 101 with respect to the vehicle position and possibly for correlation with the digital map 68, as well as for further processing of other data (speeds, etc.) transmitted from the vehicle 101, a receiver 70 and a transmitter 71.

Route data 4 is sent from the vehicle 101 to the central bureau 107. In particular, this data can be measured speeds, changes in speed, temperatures, etc. In addition to the transmission 72, a transmission 73 (from the central bureau to the vehicle) of modified parameters for reference point definition can also be transmitted between the central bureau 107 and the vehicle 101, which modified parameters are stored in storage unit of memory 65 by the vehicle 101 after reception 74 and are taken into account for the algorithm 66.

What is claimed is:

1. A method for informing a central traffic bureau about a path traveled by a vehicle having a terminal unit in a traffic network comprising:

repeatedly detecting location data representing a respective location of the terminal unit with a location device;

defining reference points at a plurality of locations by the terminal unit on the traveled path based on predetermined criteria stored in the terminal unit;

transmitting reference point information relating to the defined reference points from the terminal unit to the central bureau, wherein said defining of reference points is based on predetermined conditions, said reference points being defined when at least one additional condition relating to determined vehicle stability has been met, wherein said reference points may be defined when said at least one additional condition relating to vehicle stability is not met and another addition condition relating to a distance exceeding a distance stability lime has been met; and setting an angle limit (angle-deviation) for defining a reference point, wherein said step of defining a reference point is performed when an angular difference between a current direction and a direction at the last defined reference point exceeds the set angle limit.

2. The method set forth in claim 1, wherein said reference point information represents at least one of the last detected location of the terminal unit and the current driving direction of the vehicle.

3. The method set forth in claim 1, wherein said step of detecting is performed by a geographic positioning satellite navigation system (GPS).

4. The method set forth in claim 2, further comprising determining data representing the current driving direction from at least one of location data detected from at least two successively driven through locations along the traveled path and a direction detection device.

5. The method set forth in claim 4, wherein the direction detection device comprises a compass.

6. The method set forth in claim 4, further comprising detecting distance and direction of the vehicle by the direction detection device using wheel sensors.

7. The method set forth in claim 4, further comprising determining an angle relative to a given direction from the directional data.

8. The method set forth in claim 7, further comprising determining changes in the angle from at least one of the direction data and angle data within a given unit of time.

9. The method set forth in claim 7, further comprising determining changes in the angle from at least one of the direction data and angle data along a give distance.

10. The method set forth in claim 1, wherein said step of defining further comprises averaging at least one of the direction data and angle data along a plurality of points along a given distance of the vehicle between two defined reference points.

11. The method set forth in claim 1, further comprising storing at least one of location data, direction data, and angle data in the terminal unit along the path traveled; and transmitting the stored data to the central bureau.

12. The method set forth in claim 1, further comprising detecting speed data representing the speed of the vehicle in the terminal unit.

13. The method set forth in claim 11, wherein said storing is performed in a circular storage device.

14. The method set forth in claim 1, further comprising setting a maximum distance limit (dist-max) for defining a reference point, wherein said step of defining a reference point is caused when a distance exceeding the set maximum distance limit has been traveled since a last defined reference point.

15. The method set forth in claim 1, further comprising setting an angle stability limit (stabil-angle) for defining a reference point; and defining a stability state of the vehicle as stable when an angular difference between a current driving direction and a direction at a previous location on the traveled path of the vehicle lies below the angle stability limit, wherein said defining a stability state is performed prior to the completion of a predetermined time or distance traveled.

16. The method set forth in claim 1, wherein said predetermined conditions for defining a reference point are variable by the central bureau via radio communication.

17. The method set forth in claim 11, wherein said transmitting further comprises transmitting data relating a plurality of defined reference points including the last two defined reference points.

18. A terminal unit for communicating to a central bureau about a path traveled by a vehicle in a traffic network comprising:

a location detection device for repeatedly detecting location data representing the respective location of the terminal unit;

a device for defining reference points such that said reference points are defined at plurality of locations on the traveled path based on criteria stored in the terminal unit; and a communications device for transmitting data concerning reference points to the central bureau and having a storage device for storing information relating to path data;

wherein a reference point is only defined when predetermined conditions are met and at least one additional condition relating to vehicle stability is met;

wherein a reference point may be defined when the at least one condition relating to vehicle stability is not met provided an additional condition is met that a distance exceeding a distance stability limit has been traveled since a last location with a table state.

19. The terminal as set forth in claim 18, wherein said communications device is a mobile radio device.

20. The terminal as set forth in claim 18, wherein said position detection device comprises a geographic positioning system (GPS).

21. The terminal as set forth in claim 18 wherein said memory is a circular memory for storing location data and additional data relating to the defining of reference points.

* * * * *